May 31, 1927.

C. B. CARSON 1,630,291

INDICATING INSTRUMENT

Filed Dec. 14, 1925

Inventor
Charles B. Carson
By Edward H. Crumpton
his Attorney

May 31, 1927.
C. B. CARSON
1,630,291
INDICATING INSTRUMENT
Filed Dec. 14, 1925
2 Sheets-Sheet 2
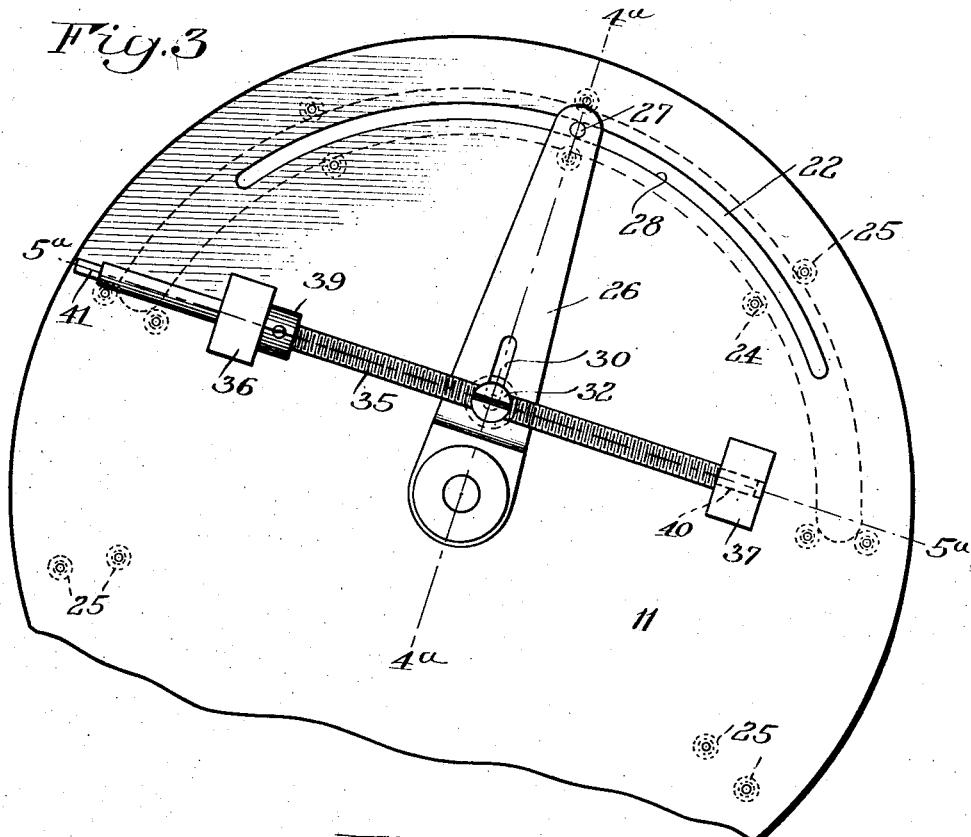
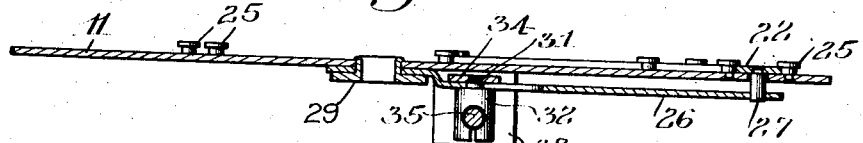
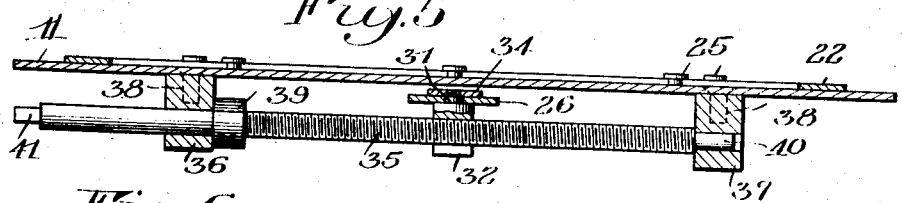
Inventor
Charles B. Carson
By Edward H. Cumpston
his Attorney Patented May 31, 1927.

1,630,291

UNITED STATES PATENT OFFICE.

CHARLES B. CARSON, OF ROCHESTER, NEW YORK, ASSIGNOR TO TAYLOR INSTRUMENT COMPANIES, OF ROCHESTER, NEW YORK, A CORPORATION OF NEW YORK.

INDICATING INSTRUMENT.

Application filed December 14, 1925. Serial No. 75,248.

The present invention relates to indicating instruments, and more particularly to a thermometer of the type adapted for connection with a steam boiler or other steam or gas holding receptacle, one object being to provide an improved thermometer of this type adapted to directly indicate the number of degrees of superheat of steam without reference to steam tables or other charts, Another object of the invention is to provide an indicating instrument embodying improved means adapted for cooperation with a temperature indicating device which can be readily set to correspond with an observed steam or gas pressure to indicate directly the degrees of superheat of the steam at any given temperature and pressure within the usual working range.

Another object of the invention is to provide improved operating and control parts for an adjustable auxiliary temperature scale in combination with an automatically operated index movable over a dial plate containing a main temperature scale for cooperation with the index, the latter being operated by any suitable temperature responsive mechanism.

To these and other ends the invention consists in certain improvements and combinations of parts, all as will be hereinafter more fully described, the novel features being pointed out in the claims at the end of the specification.

In the drawings:

Figure 3 is an enlarged fragmentary elevation looking at the rear of the dial plate and illustrating the operating means for the auxiliary temperature scale;

Figure 4 is a sectional view taken on line 4ª—4ª of Figure 3;

Figure 5 is a sectional plan taken on line 5ª—5ª of Figure 3, and

Figure 6 is an enlarged fragmentary section illustrating the construction of the guiding and retaining means for the auxiliary temperature scale.

Similar reference numerals throughout the several views indicate the same parts.

Figure 1:
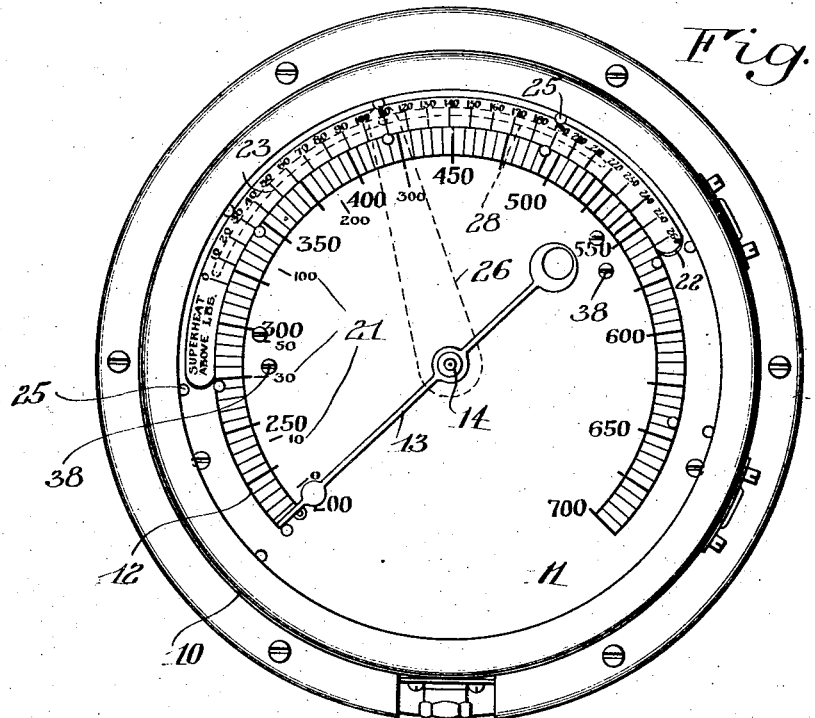
Figure 1 is a front elevation of an instrument embodying the invention.
Figure 2:
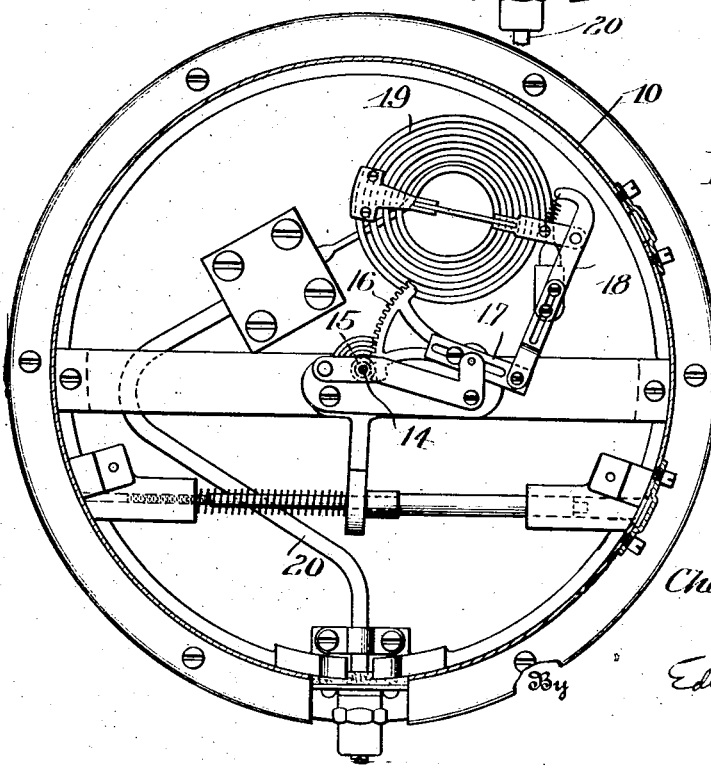
Figure 2 is a vertical section through the instrument casing looking at the rear of the index operating means.

The invention is embodied in the present instance by way of illustration in an index thermometer including a bulb not shown adapted to be inserted either in a steam chamber, a pipe line or a receptacle containing the superheated gas or fluid, the temperature and degree of superheat of which it is desired to determine, the bulb being connected with any suitable temperature responsive mechanism, a well known type of which is shown in Figure 2. This mechanism is preferably enclosed in a casing 10 provided at its front end with a dial plate 11 having a temperature scale 12 for cooperation with a pointer or pivoted index member 13. The index 13 is supported by an arbor or spindle 14 extending through the dial plate and having a pinion 15 meshing with the teeth of a pivoted gear segment 16 operated by a pair of adjustable links 17 and 18, the latter of which is operatively connected with an expansible element 19 such as a Bourdon spring. The spring is connected with a fluid pressure tube 20 with which is connected the bulb not shown adapted for insertion within the boiler or steam chamber.

A fixed scale 12 is provided with graduations marked in terms of degrees of temperature and cooperates with the pivoted index 13 to indicate the actual temperature of the steam or other gas to which the bulb is subjected.

An indicating instrument of this character is adapted to have connected therewith a device arranged to be set with reference to the steam pressure observed from a gauge and corresponding with the temperature of the scale 12 to indicate directly the number of degrees of superheat in the steam at a given temperature and pressure so that this measurement may be made and directly indicated solely by means of the thermometer without computation and without slow and cumbersome reference to steam tables, charts and the like. This result is obtained in the present embodiment by providing on the dial plate at one side of the scale 12 a fixed pressure scale 21 corresponding to the ordinary range of steam pressure.

Mounted for adjustment in a circular path adjacent the main temperature scale 12 preferably at the outside thereof, is an arcuate scale plate 22 provided with graduations 23 marked in degrees of temperature such as employed on the fixed temperature scale 12.

The auxiliary temperature scale is guided in its arcuate path by a series of studs 24 on the opposite sides thereof fixed to the dial plate, and having heads 25 serving to prevent outward displacement of the scale plate as best shown in Figure 6.

It is apparent that the scale plate may be adjusted to set the zero point of its scale to coincide with any selected pressure on the scale 21 corresponding to the observed gage pressure of the steam or gas. The reading on the scale 23 then indicated by the index 13 gives the number of degrees of superheat in the steam at the given temperature. For example if the observed steam pressure is 300 pounds, the scale plate 22 is adjusted to bring the zero point thereof opposite this point on the scale 21. If then the index 13 stands at the 445° point on the scale 12, the reading on the auxiliary temperature scale will be approximately 20° which indicates that the steam contains that amount of superheat.

Any suitable means may be provided for adjusting the scale plate 22, but I preferably employ for this purpose a pivoted arm or lever 26 adapted to receive at its outer end a pin 27 suitably connected with the scale plate and operable in a slot 28 formed in the dial plate as shown in Figure 3. The arm is pivotally supported at the center of the dial plate by a hollow bearing 29 through which the index spindle 14 is adapted to project, the bearing being connected with the dial plate in any suitable manner. The arm is slotted at 30 to receive the reduced portion 31 of a nut 32, the latter being free to slide upon the arm and secured thereon, preferably by a member 34 threadedly engaging the reduced portion 31 of the nut as shown in Figure 4. An operating screw 35 is threaded through the nut and supported by bearings 36 and 37 secured upon the dial plate preferably by screws 38 as shown in Figure 5. A collar 39 on the operating screw engages the bearing 36 to prevent longitudinal movement of the screw in one direction, the collar being secured in any suitable manner. The screw at its opposite end is reduced at 40 whereby to form a shoulder in engagement with the bearing 37 to prevent longitudinal displacement of the screw in an outward direction. The operating end of the screw is preferably squared as at 41 to receive a socket wrench or other suitable tool insertible through an opening in the casing 10 for turning the screw to effect a swinging movement of the arm whereby to adjust the scale plate 22 when it is desired to determine the number of degrees of superheat contained in the steam.

The invention thus provides an instrument of practical form adapted to simultaneously indicate the steam temperature, and by a simple setting of the adjustable scale plate in accordance with an observed gage pressure to indicate directly the number of degrees of superheat, corresponding to such temerature and pressure, thereby obviating the inconvenience, waste of time and likelihood of error attendant upon the resort to tables and charts for such data.

I claim as my invention:

1. In an instrument of the class described, the combination with an arcuate temperature scale, of a fixed arcuate pressure scale disposed along one side thereof, an arcuate temperature scale movable along the other side of the said temperature scale, graduated to indicate degrees of superheat, and means for moving the movable scale.

2. In an instrument of the character described, the combination with a circular temperature scale, of a circular pressure scale in fixed concentric relation thereto, a circular temperature scale graduated to indicate degrees of superheat and movable along a path concentric with said scales and means for moving the said movable scale.

CHARLES B. CARSON.